US008651691B2

(12) United States Patent
Grajcar

(10) Patent No.: US 8,651,691 B2
(45) Date of Patent: Feb. 18, 2014

(54) INTEGRAL CONDUIT MODULAR LIGHTING

(75) Inventor: Zdenko Grajcar, Crystal, MN (US)

(73) Assignee: ONCE Innovations, Inc., Plymouth, NJ (US)

( * ) Notice: Subject to any disclaimer, the term of this patent is extended or adjusted under 35 U.S.C. 154(b) by 306 days.

(21) Appl. No.: 13/077,955

(22) Filed: Mar. 31, 2011

(65) Prior Publication Data
US 2011/0241559 A1    Oct. 6, 2011

Related U.S. Application Data

(60) Provisional application No. 61/319,726, filed on Mar. 31, 2010.

(51) Int. Cl.
*B60Q 1/26* (2006.01)

(52) U.S. Cl.
USPC . 362/227; 362/235; 362/249.01; 362/249.02; 362/800

(58) Field of Classification Search
USPC ............... 362/227, 235, 249.01, 249.02, 362, 362/551, 555, 560, 800; 257/74, 98–100
See application file for complete search history.

(56) References Cited

U.S. PATENT DOCUMENTS

2005/0077525 A1*  4/2005  Lynch et al. ..................... 257/74
2010/0061108 A1*  3/2010  Zhang et al. ................... 362/364

OTHER PUBLICATIONS

International Preliminary Report on Patentability issued in PCT/US2011/030843, mailed on Oct. 2, 2012.

* cited by examiner

*Primary Examiner* — Stephen F Husar
*Assistant Examiner* — Meghan Dunwiddie
(74) *Attorney, Agent, or Firm* — McDermott Will & Emery LLP

(57) ABSTRACT

Apparatus and associated methods involve a light module adapted to mount to an open face of a conduit body. In an illustrative example, the light module may include an electrical interface for making operative electrical connection to conductors disposed within the conduit body. In some particular embodiments, the electrical interface may include an insulation displacement-style connector to facilitate installation and/or removal of the light module. In various examples, the conduit body may substantially conform to a form factor of a conduit body for a conventional conduit system.

19 Claims, 14 Drawing Sheets (a)

(b)

INTEGRAL CONDUIT MODULAR LIGHTING

CROSS-REFERENCE TO RELATED APPLICATIONS

This application claims priority to U.S. Provisional Patent Application entitled "Integral Conduit Modular Lighting," Ser. No. 61/319,726, which was filed by Z. Grajcar on Mar. 31, 2010, the entire contents of which is incorporated herein by reference.

CROSS-REFERENCE TO RELATED APPLICATIONS

Various embodiments relate generally to methods and apparatus involving lighting integrated with a conduit.

TECHNICAL FIELD

Various embodiments relate generally to methods and apparatus involving lighting integrated with a conduit.

Lighting can be an important consideration in some applications. In commercial or residential lighting, for example, various types of lighting systems have been commonly used for general illumination. For example, common lighting systems that have been used include incandescent or fluorescent lamps.

More recently, LEDs (light emitting diodes) are becoming widely used devices capable of illumination when supplied with current. Typically, an LED is formed as a semiconductor diode having an anode and a cathode. In theory, an ideal diode will only conduct current m one direction. When sufficient forward bias voltage is applied between the anode and cathode, conventional current flows through the diode. Forward current flow through an LED may cause photons to recombine with holes to release energy in the form of light.

The emitted light from some LEDs is in the visible wavelength spectrum. By proper selection of semiconductor materials, individual LEDs can be constructed to emit certain colors (e.g., wavelength), such as red, blue, or green, for example.

In general, an LED may be created on a conventional semiconductor die. An individual LED may be integrated with other circuitry on the same die, or packaged as a discrete single component. Typically, the package that contains the LED semiconductor element will include a transparent window to permit the tight to escape from the package.

SUMMARY

Apparatus and associated methods involve a light module adapted to mount to an open face of a conduit body. In an illustrative example, the light module may include an electrical interface for making operative electrical connection to conductors disposed within the conduit body. In some particular embodiments, the electrical interface may include an insulation displacement-style connector to facilitate installation and/or removal of the light module, In various examples, the conduit body may substantially conform to a form factor of a conduit body for a conventional conduit system.

Various embodiments may achieve one or more advantages. For example, some embodiments may be easily installed using conventional methods to provide electrical conductors through conventional conduit lines. A light module may be installed rapidly, for example, using an insulation displacement interface to connect the light module to one or more conductors in the conduit line. A chamber of the light module may be substantially sealed by a lens cover, and in some embodiments the light module may form a substantial seal against ingress of dust or moisture when assembled to the conduit body. In some embodiments, the light module may include light emitting diodes that may output, for example, above about 60 lumens per watt. In some embodiments, the light output may be modulated in intensity and/or color in response to a control signal, which may, in some embodiments, be encoded in an excitation current and/or voltage waveform. Certain embodiments may achieve enhanced efficiency by outputting a spectral intensity distribution tailored to, at least partially, substantially match a spectral sensitivity for a vision capability of a predetermined species.

The details of various embodiments are set forth in the accompanying drawings and the description below. Other features and advantages will be apparent from the description, drawings, and/or the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
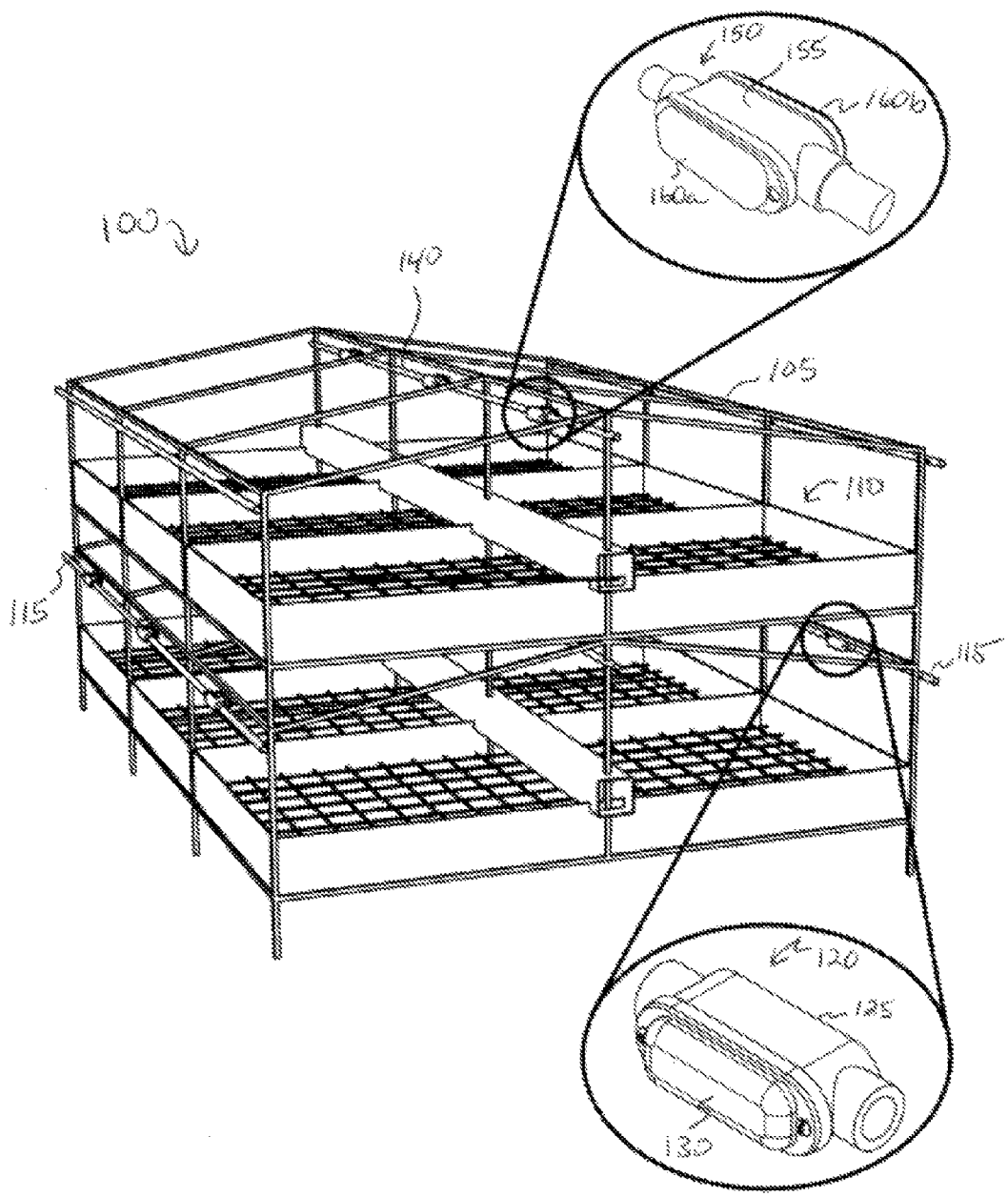
FIG. 1 show a perspective view of an illustrative free range-style chicken coop installation with an exemplary embodiment of an integral conduit modular (ICM) lighting system.

FIG. 1 show a perspective view of an illustrative free range-style chicken coop installation with an exemplary embodiment of an integral conduit modular (ICM) lighting system. In this example, a coop installation 100 includes a frame 105 and a number of bays 105 disposed on rows of three bays on both a lower level and an upper level. In an illustrative example of egg production, a number of chickens may spend at least part of their time in the bays where they may receive food, air, water, and they may also deposit eggs. In some coop installations, the eggs may roll down a ramp (not shown) to an egg collection/conveyer system (not shown).

On the lower level of the coop installation 100, an interior volume of each of the bays 110 is illuminated by an integral conduit modular lighting system that includes sections of electrical conduit 115 connected to corresponding ports of a number of integral light modules (ILMs) 120. Each of the ILMs 120 includes a conduit body 125 and a light engine 130 attached to an open longitudinal face of the conduit body 125. For the depicted lower level of bays 110, the conduit 115 and ILMs 120 are positioned to direct from a peripheral position outside the frame 105 and toward a central midline of the coop installation 100. The ILMs 120 are positioned substantially in an upper portion of the bays 110 of the lower level to promote sufficient illumination of the water and feed facilities within each of the bays 105. The ILM 120 may advantageously provide substantial illumination of food and water access facilities in the bays 110 while the bays are substantially populated with chickens.

By way of example, and not limitation, and in various implementations, the conduit 115 and/or the conduit body 125 may be of a standard or conventional type which my be used by electricians, for example, to install electrical wiring. In the depicted example, the conduit body 125 may be of the type of conduit body for rigid conduit that is commercially available in standard sizes, for example, from Thomas & Betts Corporation of Tennessee.

On the upper level of the coop installation 100, an interior volume of each of the bays 110 is illuminated by an integral conduit modular lighting system that includes sections of electrical conduit 140 connected to corresponding ports of a number of integral light modules (ILMs) 150. Each of the ILMs 150 includes a conduit body 155 and oppositely directed light engines 160a, 160b attached to opposing open longitudinal faces of the conduit body 155. For the depicted upper level of bays 110, the conduit 140 and the ILMs 150 are positioned to direct light outward from a central position along the midline of the coop installation 100. Each of the ILMs 150 in the upper level are positioned substantially in an upper portion of the bays 110 to provide sufficient illumination of the water and feed facilities within the bays 110 on either side of the midline of the coop installation 100. The ILM 150 may advantageously provide substantial illumination of food and water access facilities in the bays 110 while the bays are substantially populated with chickens.

Figure 2:
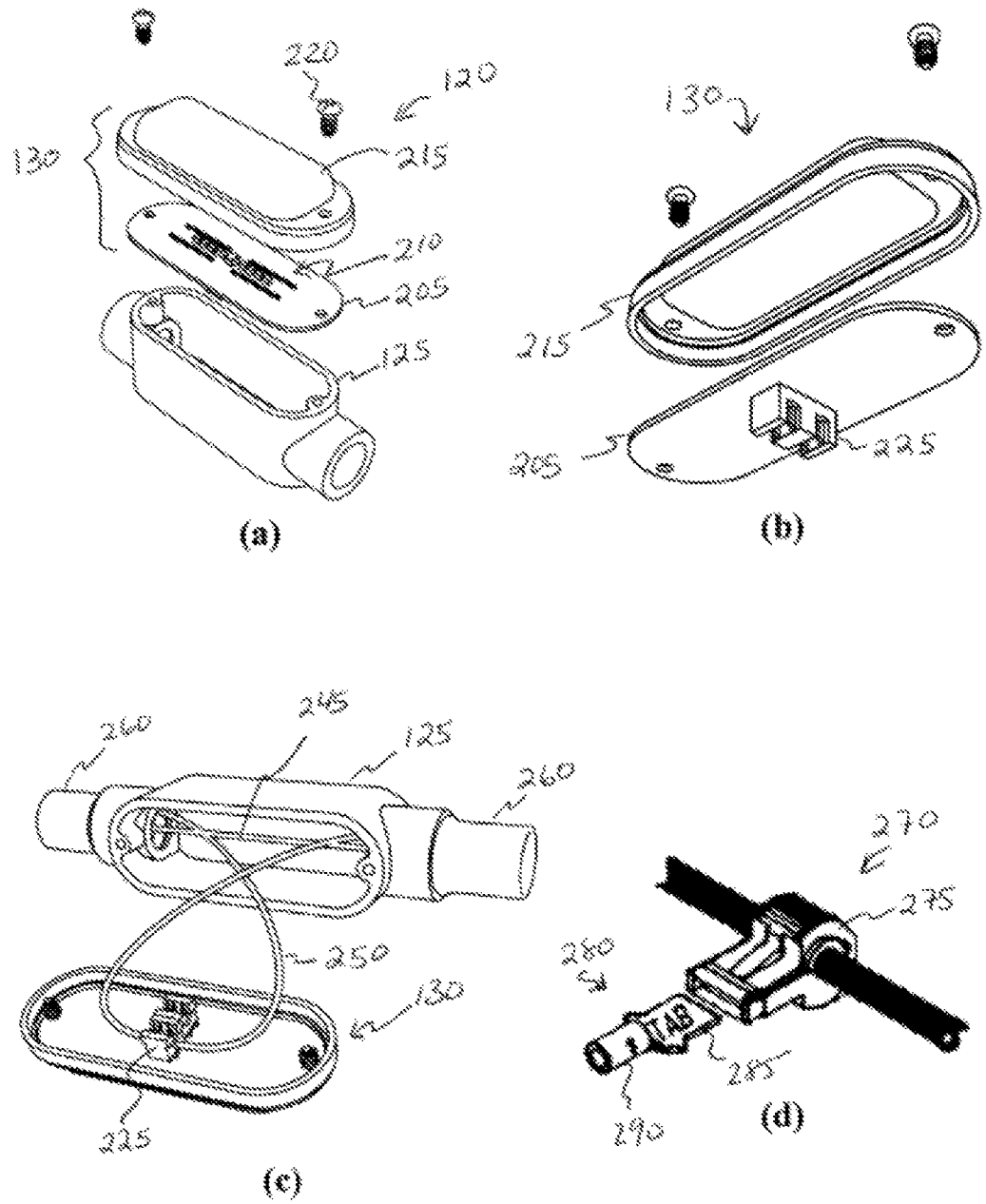
FIG. 2 shows perspective exploded views to illustrate exemplary assembly operations for assembling electrical conductors to embodiments of an ICM light engine.

FIG. 2 shows perspective exploded views to illustrate exemplary assembly operations for assembling electrical conductors to embodiments of an ICM light engine.

In particular, FIG. 2(a) depicts an exemplary exploded perspective view show additional detail for the conduit body 125 and the light engine 130 of the ILM 120 of FIG. 1. The ILM 120 includes the conduit body 125 and the light engine 130. The conduit body 125 has an elongated dimension defining cavity that is extended along a longitudinal axis. In this example, each end of the conduit body 125 includes a threaded port centered on the longitudinal axis for joining to conduit. The conduit body 125 has an open side, which may be referred to hereinafter as an open face.

The light engine 130 includes a light board 205 with a number of light source elements 210, and a lens/cover 215. When assembled, the light board 205 and the lens 215 define a light chamber cavity. In some implementations, the light chamber may be substantially sealed to resist the ingress of moisture, contaminants or foreign objects. In some examples, the seal may resist ingress of water, such as may be sprayed under pressure from a hose, for example.

The light hoard 205 may include electrical circuitry arranged on a substrate (e.g., printed circuit board, flex circuit, or the like) to supply electrical excitation to the light source elements 210. The light board 205 may receive electrical excitation from conductors disposed in the cavity of the conduit body. In some implementations, the light board 205 may condition the received electrical excitation, for example, using digital, analog, or a combination of such signal processing techniques.

During assembly, the components 205, 210, 215 of the light engine 130 may be securely attached to the conduit body 125 by fasteners 220. In some implementations, the light engine 130 may be sealed and/or secured to the conduit body by adhesive, magnetic, or mechanical fasteners, and/or a combination of such fasteners. In various implementations, the light engine 130 may be easily removed from the conduit body 125 by hand or using a tool (e.g., screwdriver) to facilitate replacement. In some other implementations, the attachment mechanism may include vandal-resistant features, such as non-standard screws that require a specific tool to remove.

In some embodiments, assembly operations include providing a light engine 130 as a subassembly. FIG. 2(b) depicts an exemplary light engine 130 in an exploded view from a bottom perspective to show further detail. The light board 205 includes a board interface 225 on a surface opposite of the surface to make rapid electrical connection to conductors, as will be described in further detail with reference to FIG. 2(c).

The lens 215 provides interior location and registration features to receive, register and locate the light board 205 within the lens 215. The light board 205 may be substantially sealed to the lens 215, for example with adhesive gaskets, applied adhesives, by addition of potting compound, or by a mechanical faster. In some embodiments, the fasteners 220 may be configured as captive screws that form part of the light engine 130 as a subassembly for installation on a selected conduit body. Captive screws for the fasteners 220 may further advantageously simplify assembly by reducing labor required to install the light engines 130 to the conduit body 125.

FIG. 2(c) depicts an exemplary installation operation in which the light engine 130 has been partially installed. In this example, two insulated conductors 245 and 250 extend through the conduit body cavity and two conduit couplers 260 that are installed in each of the two ports of the conduit body 125. To illustrate an exemplary installation, the insulated conductor 250 is depicted as pulled with sufficient slack to form a small loop. The board interface 225, which is depicted as a two-terminal insulation displacement type board-mounted connector, receives the wire and makes electrical connection from the conductor 250 to a node of the circuitry of the light board 205. A subsequent operation (not shown) would involve installing the insulated conductor 245 to the remaining open terminal of the board interface 225 to form a complete circuit. In various examples, any practical number of ILMs may be connected in parallel to a pair or conductors, such as the conductors 245, 250.

FIG. 2(d) shows an example of another connector system embodiment that may be used for the board interface 225. A wire interface system 270 includes a wire-to-hoard female connector 275 that pierces insulation around a wire to make electrical connection to the conductor. As an example, such a connector is commercially available as a self-stripping electrical tap connector and is sold by 3M Electrical Markets Division of Austin, Tex. A corresponding board-mourned male connector 280 with a tab 285 and solder post 290 may be installed (e.g., soldered) in place of the board interface of FIG. 2(b), for example. As such, rapid installation/removal of electrical connection to the light engine 130 may be advantageously accomplished by plugging/unplugging of the connectors 275 to the corresponding tabs 285.

In some implementations, the foregoing operations may be repeated to make connection to a third or further additional conductors. For example, an additional conductor may provide a control signal to the signal processing circuitry on the light board 205. In some examples, yet a further additional conductor may be connected to the light board 205 to provide a reference potential (e.g., earth ground).

Figure 3:
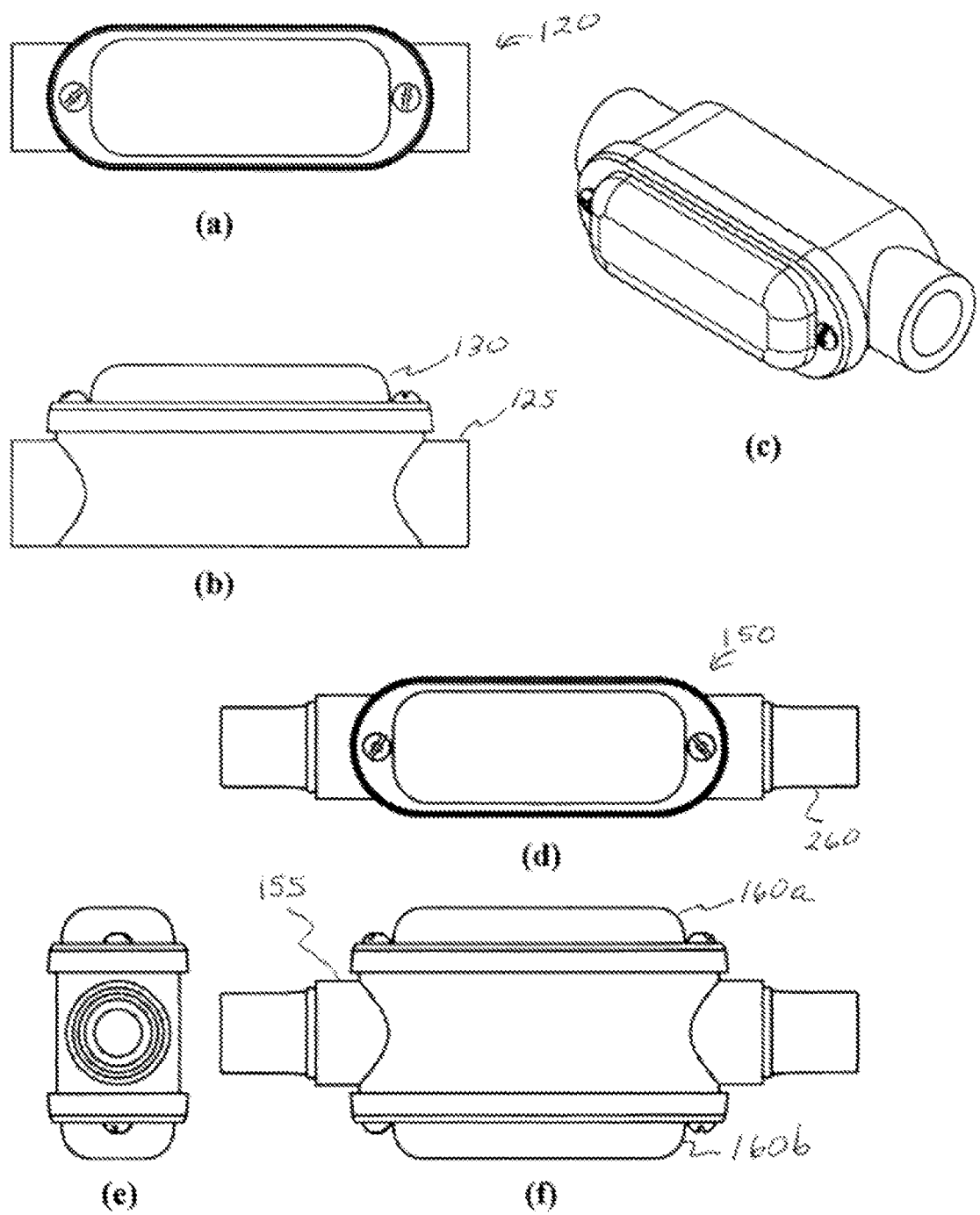
FIG. 3-4 show views of various embodiments of an assembled ICM light module.
Figure 4:
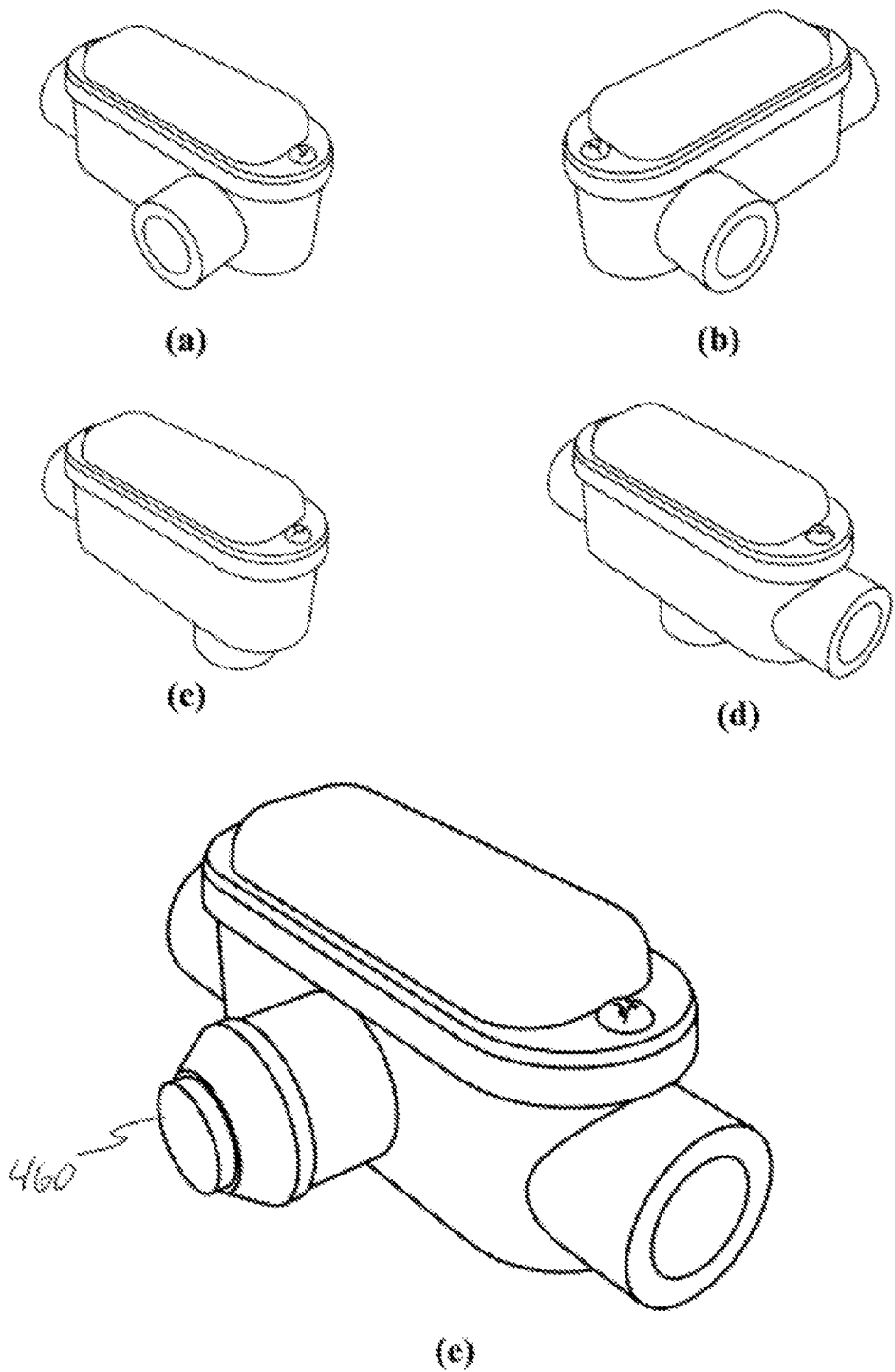

FIG. 3-4 show views of various embodiments of an assembled ICM light module.

FIGS. 3(a,b,c) illustrate top, side, and perspective views of the exemplary ILM 120 with the light engine 130 assembled to the conduit body 125.

FIGS. 3(d,e,f) illustrate top, side, and perspective views of the exemplary ILM 150 with the oppositely-directed light engines 160a, 160b assembled to opposite open faces of the conduit body 155.

FIGS. 4(a-e) illustrate exemplary port configuration embodiments for a conduit body with a single open face, such as the conduit body 120. Exemplary port configurations similar to those depicted in FIGS. 4(a,b,e) may be applied to variations of the conduit body 150, which has two open faces.

FIG. 4(e) illustrates an exemplary embodiment in which a lateral port of the conduit body in configured with a user input control 460 (e.g., button) which may be used to control operation of an integral conduit modular (ICM) lighting system. For example, the user input control may be arranged to interrupt current supplied to one or more ILMs in an ICM lighting system.

Figure 5:
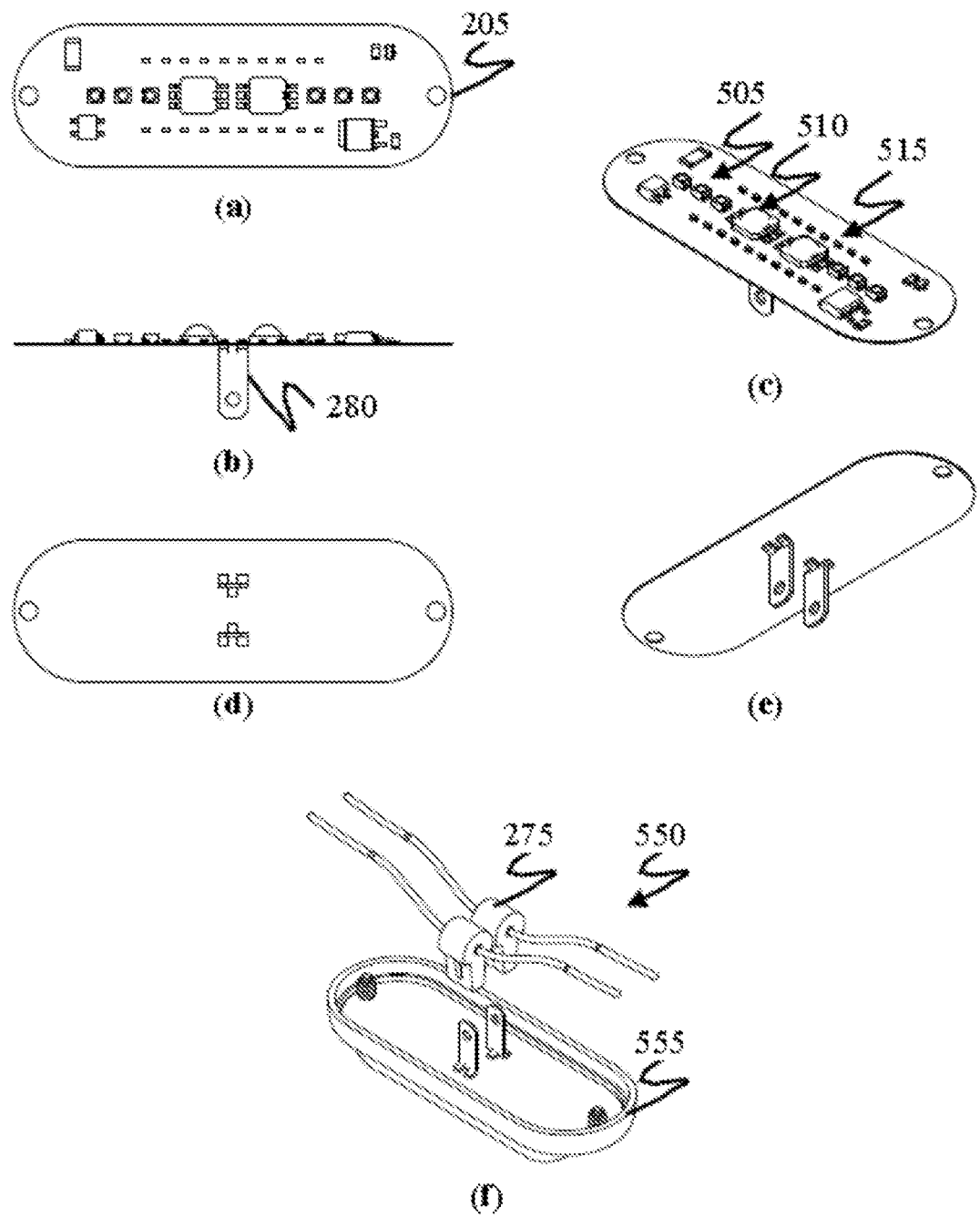
FIG. 5 shows views of an exemplary light board assembly for an ICM light module.

FIG. 5 shows views of an exemplary light board assembly for an ICM light module. In this example, the light board 205 is configured to condition electrical excitation received at the board interface 280 and to supply the conditioned electrical excitation to a number of light sources, including light sources 505, 510, and 515, These light sources are depicted as different light sources, for example, red, blue and white LEDs. In an example, the light sources 505-515 may include substantially different illuminants in terms of wavelength output, intensity, and/or optical characteristics. Examples of groups different light sources that my be operated in combination in a light fixture that may be suitable are described, for example, with reference to at least FIGS. 7-9 of U.S. Provisional Patent Application entitled "Light Sources Adapted to Spectral Sensitivity of Diurnal Avians," Ser. No. 61/314,617, which was filed by Z. Grajcar on Mar. 17, 2010, the entire contents of which are incorporated herein by reference.

FIG. 5(f) depicts an exemplary installation operation in which a subassembly 550 has been prepared to install a pair of conductors, each with a wire to board connector 275 for releasably mating to the tab 285 of a corresponding board-mounted male connector 280 of a light engine 555.

Figure 6:
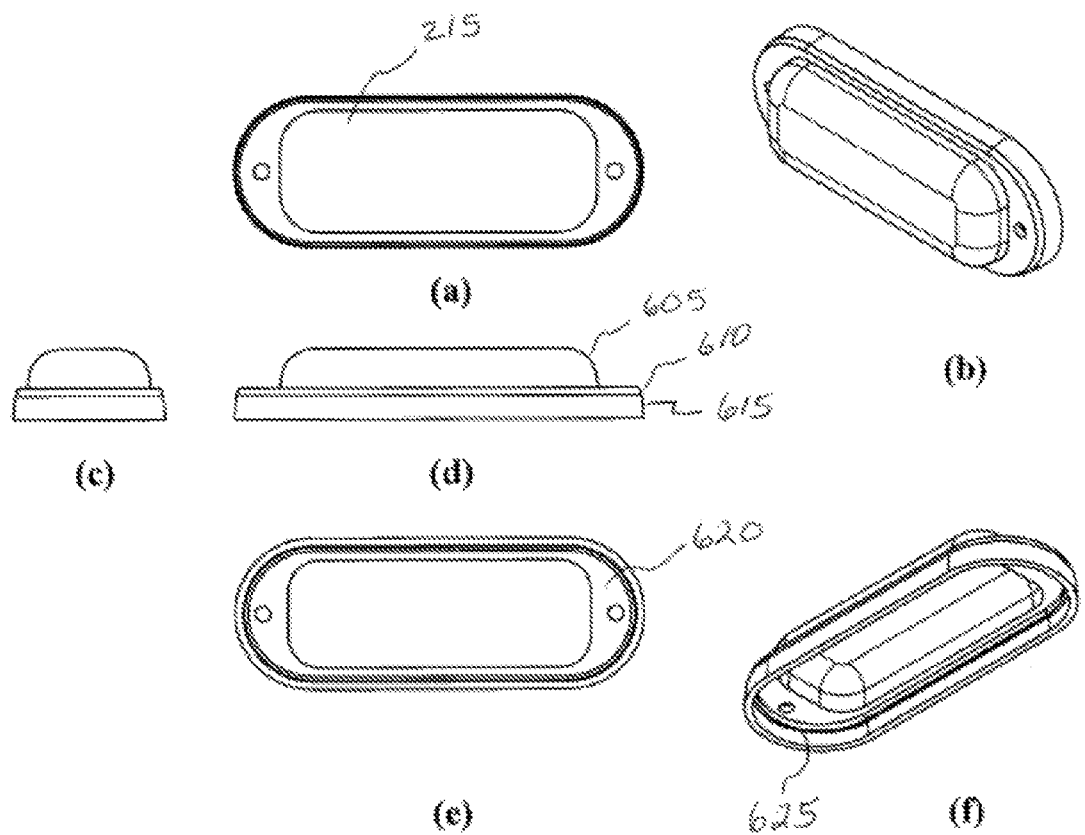
FIG. 6 shows views of an exemplary lens assembly for an ICM light module.

FIG. 6 shows views of an exemplary lens assembly for an ICM light module. FIGS. 6 (a-f) illustrate depict the lens assembly 215 with an optical lens 605 through which substantially most of the light passes to escape the light chamber. The optical lens portion 605 may be clear or semi-transparent, for example, to promote diffusion. The optical lens portion 605 is supported on a lens base portion 610. A shroud portion 615 extends away from the optical lens 605, and may provide proved resistance to ingress of dust or contaminants in the light chamber of the ILM. FIG. 6(f) illustrates an inner wall 625 that may substantially closely correspond to a perimeter of the light board 205 in sealable embodiments.

The lens 215 may be substantially transparent to provide a path for light exiting the sealed light chamber. In some examples, the lens may be made substantially of a plastic film or glass substrate, for example. By way of example and not limitation, the lens may be formed in whole or part of polyester, polycarbonate, acrylic, glass, fused silica, or a combination of such substrates. In some examples, optical properties of the lamp may be modified by a process such as sand blasting. In some examples, a film may be deposited (e.g., as a sheet or by spray on at least a portion of the lens substrate, which may be glass or plastic, for example. Diffuser films are commercially available, for example, from Luminit LLC of Torrance, Calif. In one implementation, a holographic diffuser may be applied as a film to one or both surfaces of the lens. The lens may include a Fresnel lens. The lens may be substantially flat in some examples.

Figure 7:
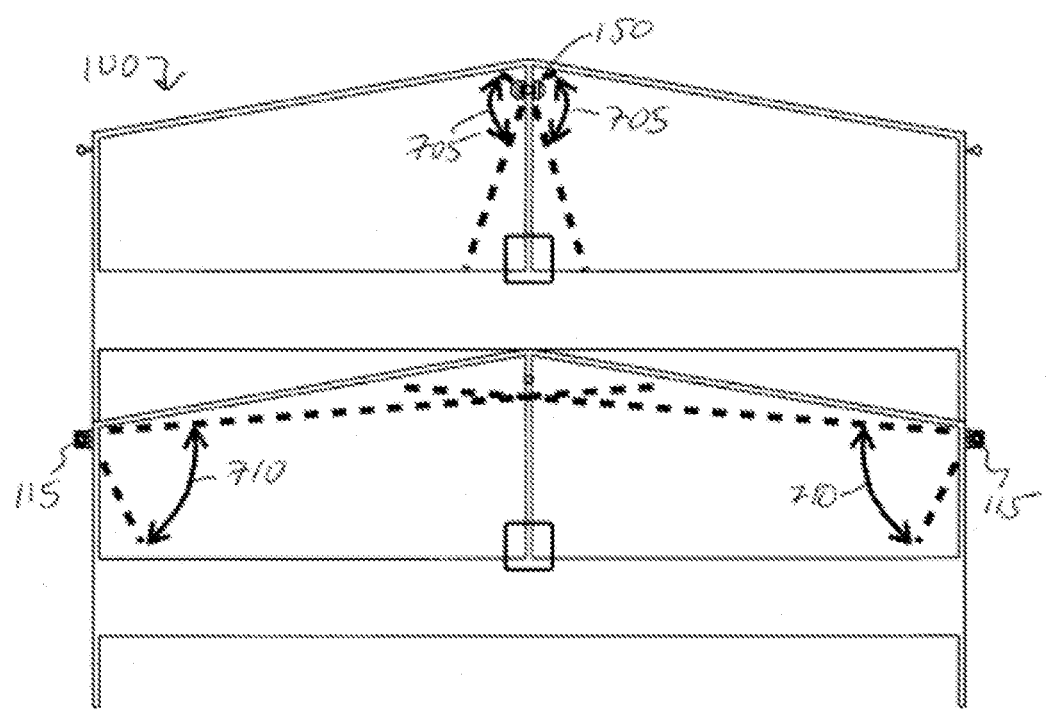
FIG. 7 depicts end and side view of the illustrative free range-style chicken coop installation of FIG. 1, with an illustration of exemplary illumination from the ICM lighting system.
Figure 7:
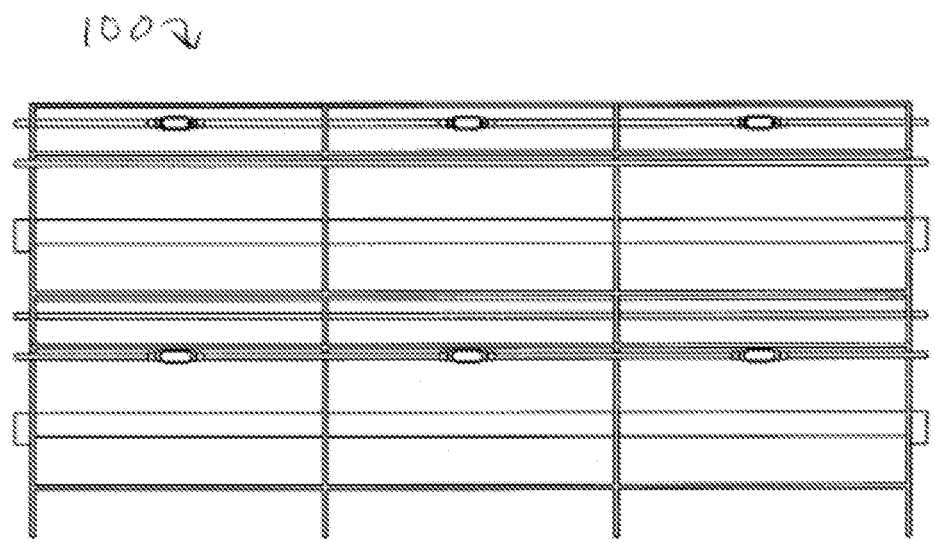

FIG. 7 depicts end and side views of the illustrative free range-style chicken coop installation of FIG. 1, with an illustration of exemplary illumination from the ICM lighting system. In the upper level of the coop installation 100, the ILM 150 projects light in two opposing directions, with an exemplary beam distribution angle 705 that illuminates substantially most of the volume of the bays 110. Similarly, in the lower level of the coop installation 100, the two ILMs 120 projects light in opposing directions, with an exemplary beam distribution angle 710 that illuminates substantially most of the volume of the bays 110.

Figure 8:
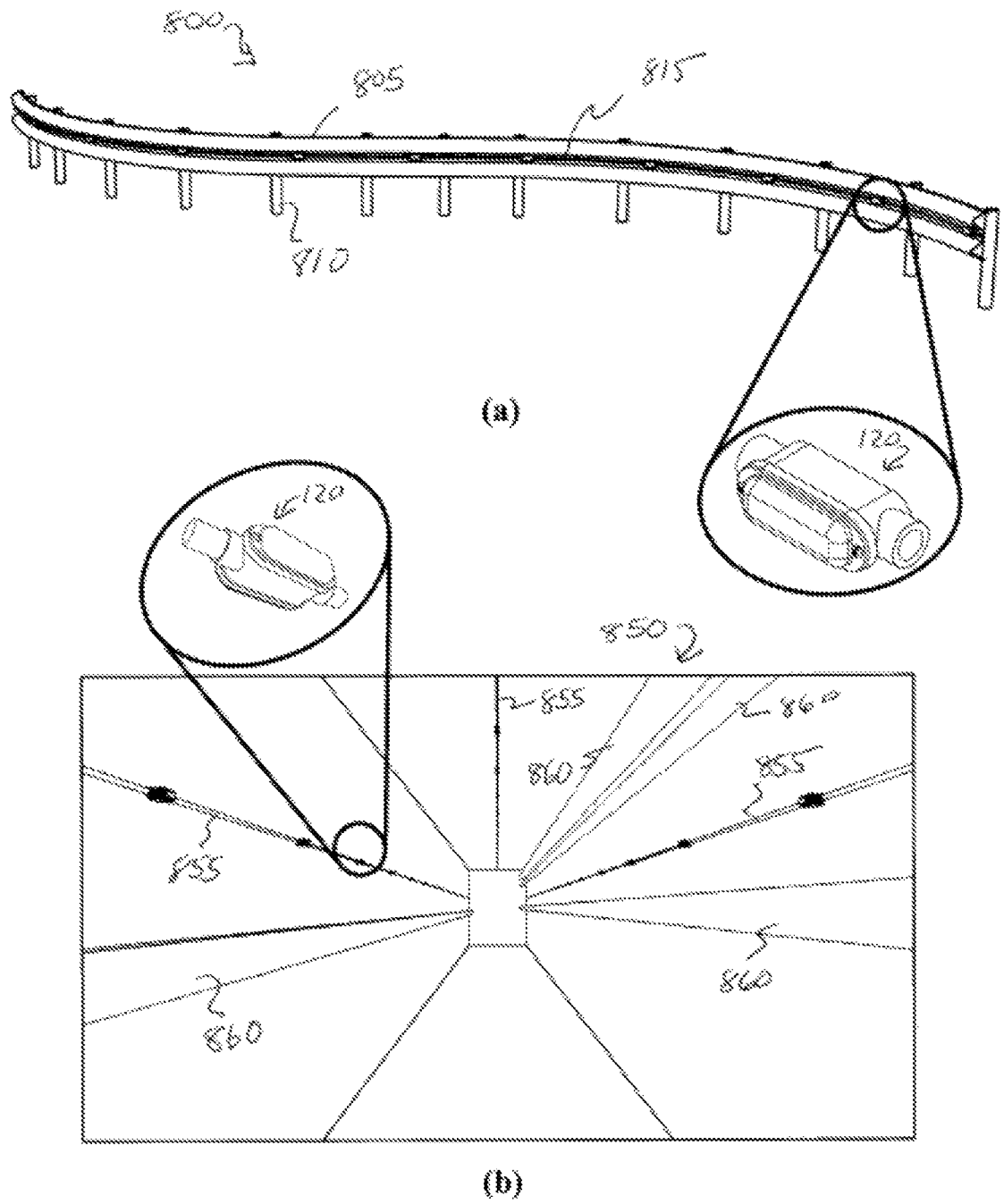
FIGS. 8-9 show perspective views of embodiments of the ICM installed various applications.
Figure 9:
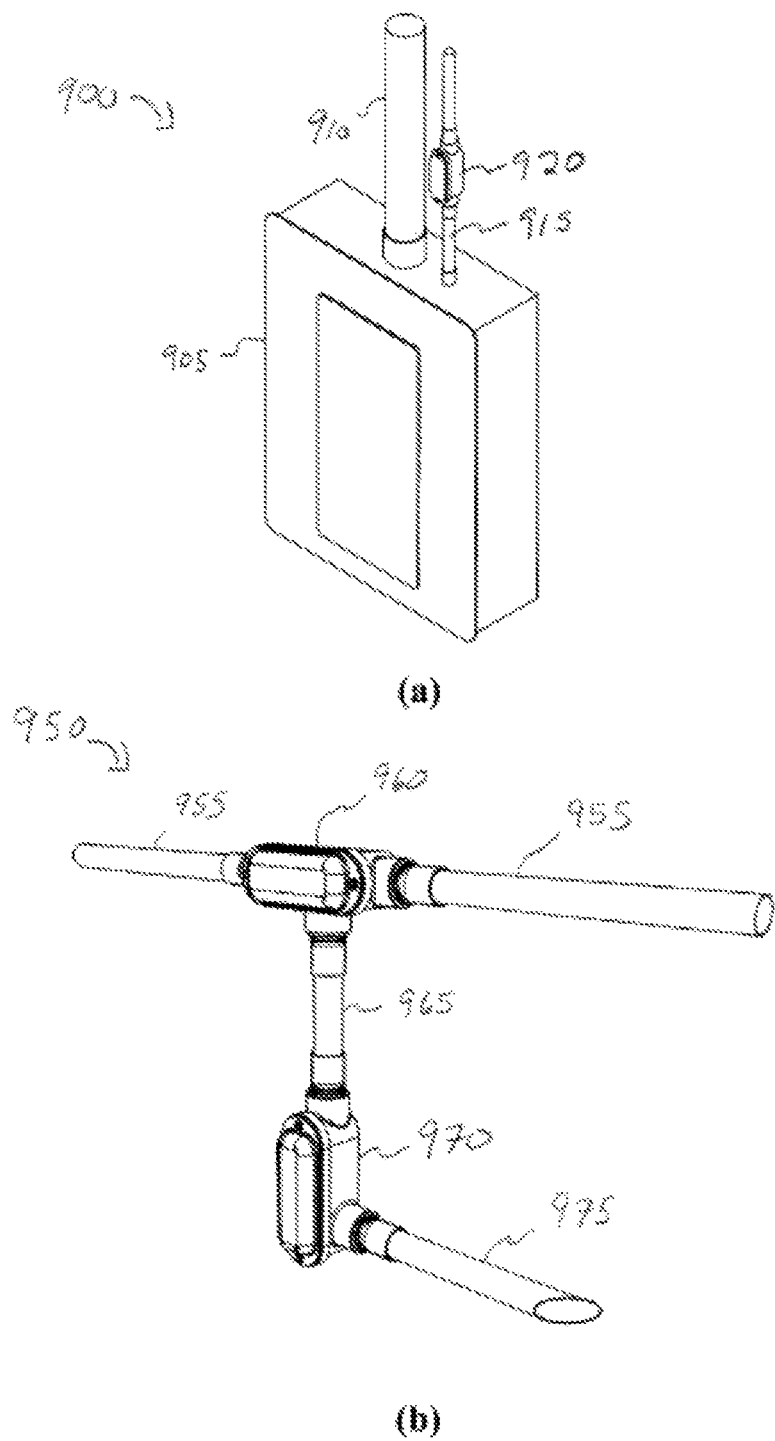

FIGS. 8-9 show perspective views of embodiments of the ICM installed in various applications.

FIG. 8(a) depicts an exemplary roadside illumination system integrated into a roadside barrier system 800. The system 800 includes a guard rail 805 mounted on support members 810, and it features illumination with an ICM lighting system 815 to promote safety. As depicted, the conduit sections may be flexible conduit, or the ICM conduit sections may be shaped to substantially conform to the shape of the guard rail 805, as dictated by road contours. The illumination provided by the ICM lighting system 815 may provide advantages in dynamic illumination, with extremely high efficiency, low power consumption, high power quality, and high reliability and long life, for example, using LED light sources as described herein.

FIG. 8(b) depicts a typical service corridor 850 illuminated at intervals with the ILM 120 on the ICM lighting systems 855, which may be installed in parallel with various conduits 860 that may extend through at least a portion of the service corridor 850. The ICM lighting systems may advantageously provide low cost, reliable lighting that may be readily installed in such an environment.

FIG. 9(a) depicts an illustrative electrical apparatus 900 including an electric service panel 905 (e.g., circuit breaker box) that received AC service via a conduit 910. A conduit 915 is connected to supply AC service to the ILM 920 on its own circuit. As such, the ILM 920 may illuminate the area on or around the service panel 905 even if the circuit breaker that supplies general illumination to the service panel area has interrupted power to the general illumination (if any) in the area around the service panel 905. In various examples, one or more ILMs may be configured to direct light so as to illuminate portions of the service panel that may be viewed during maintenance, for example. In some implementations, the ILM 920 may have a user input control to enable/disable the light, such as the exemplary user input control described with reference to FIG. 4(e).

FIG. 9(b) shows an exemplary portion of an ICM lighting system 950 with a non-linear spatial arrangement of ILMs 960, 970. In this example, conduits 955 are aligned along a longitudinal axis of the conduit body 960. However, a conduit 965 is arranged orthogonal to the longitudinal axis of the conduit body 960. ILM 970 is oriented with its longitudinal axis orthogonal to the orthogonal axis of the conduit body 960, and has a conduit 975 extending from a port aligned along an axis orthogonal to the longitudinal axis of the conduit body 970. Various other embodiments may be spatially arranged in different orientations, and may not be arranged to be coplanar.

Figure 10:
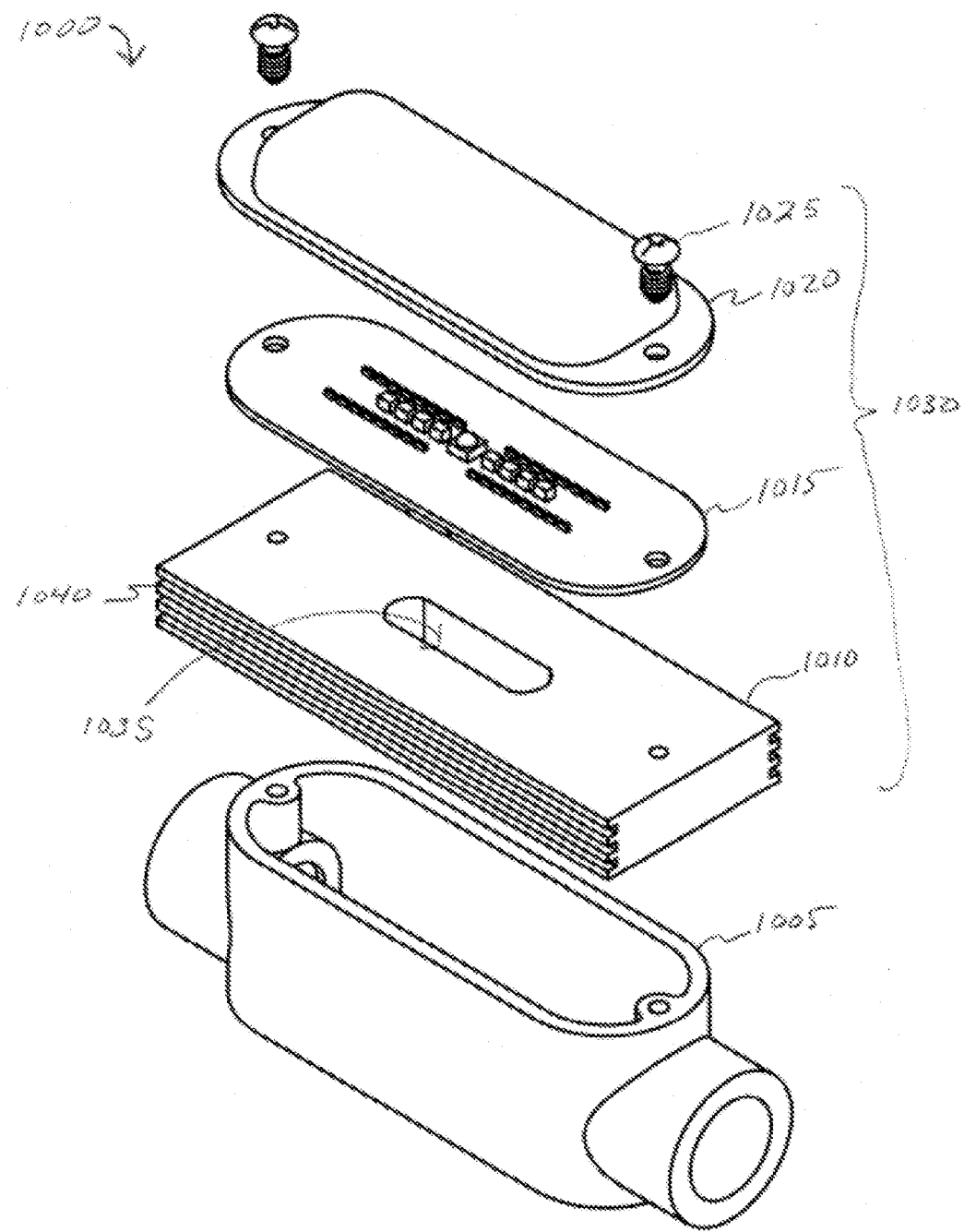
FIG. 10 shows an exploded perspective view of an exemplary ICM assembly with enhanced thermal management.

FIG. 10 shows an exploded perspective view of an exemplary ICM assembly with enhanced thermal management. The depicted embodiment, which may be suitable for industrial lighting or for agricultural lighting of livestock such as swine or cattle, for example, includes a conduit body 1005 for assembly to a light engine 1030. The light engine 1030 includes a thermal management element 1010, a light board 1015, a lens 1020, and fasteners 1025. When assembled, the light board 1015 is supported in direct thermal contact with the thermal management element 1010. The thermal management element 1010 includes a central aperture to accommodate electrical connection of the board interface 225 to the electrical conductors in the cavity of the conduit body 1005. The thermal management element 1010 includes fins to increase surface area to promote heat transfer to ambient air, for example. By way of example, and not limitation, the thermal management element 1010 may include extruded, cast, stamped, or milled materials of relatively high thermal conductivity (e.g., aluminum, anodized metal) to promote heat transfer from the light board 1015 to a local ambient heat sink.

FIGS. 11-14 show views of further exemplary embodiments for an ICM.

Figure 11:
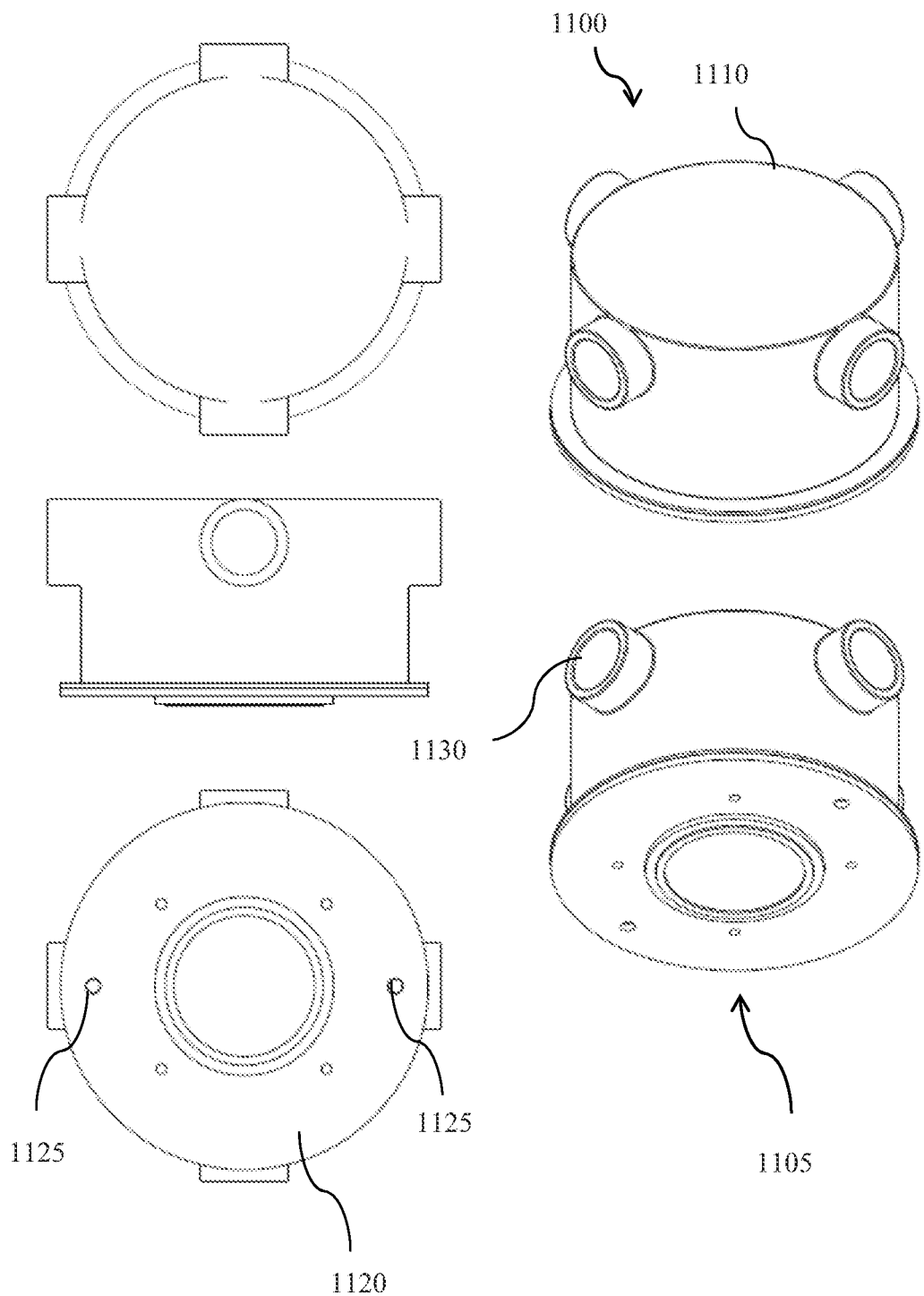
FIGS. 11-14 show views of further exemplary embodiments for an ICM.

FIG. 11 shows views from various perspectives of an exemplary low profile light engine module 1105 mounted to a conduit body 1110 that has a substantially round form factor forming a corresponding cavity. The light engine module 1105 includes a housing e.g., metal or plastic or combination thereof) to provide a thermal heat sink to manage a temperature of the light source and driver circuitry contained in the light engine module 1105. The housing is formed to have a thermally conductive flange 1120 with mounting holes 1125 to enable direct attachment to attachment points in the conduit body 1110. In some examples, the attachment points in the conduit body may be standardized receptacles, which may be molding or machining. The conduit body 1110 depicted in this example further includes apertures 1130 to provide for wiring to an internal cavity formed within the conduit body 1110 and the light engine module 1105.

In some applications, the light engine module 1105 may be mechanically installed or uninstalled rapidly to and/or from the conduit body by for example installing or removing two or more screws through a pair of mounting holes 1125 when registered with the standardized attachment points of the conduit body 1110. In some other examples, one or more barbed posts anchored to the conduit body may provide rapid attachment of a tight engine module to a standard conduit body, for example, without requiring any tools to complete the mechanical attachment. In some applications, a tool may be used to form the electrical interface between the tight engine module 1105 and the supplied wiring in the cavity of the conduit body 1110.

In various embodiments, the conduit body 1110 may be formed in a different shape, such as square, rectangular, pentagon, hexagon, octagon, or have any practical number of sides. The sides may be of different lengths, such as in a rectangular form factor, for example.

Figure 12:
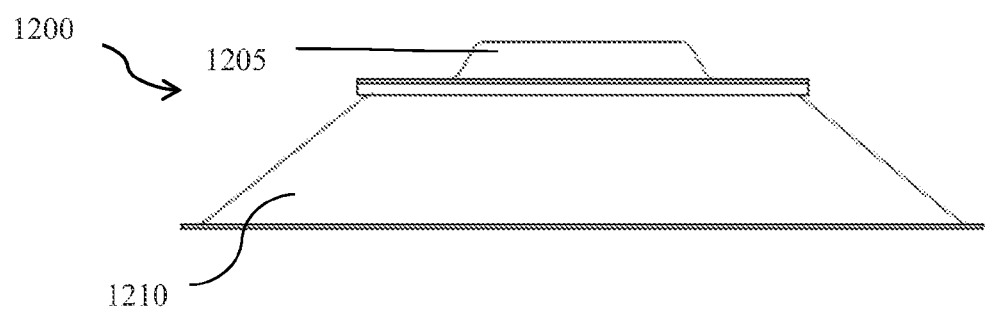
Figure 12:
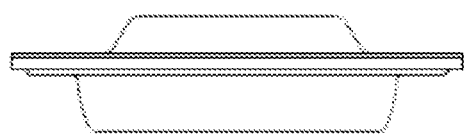
Figure 12:
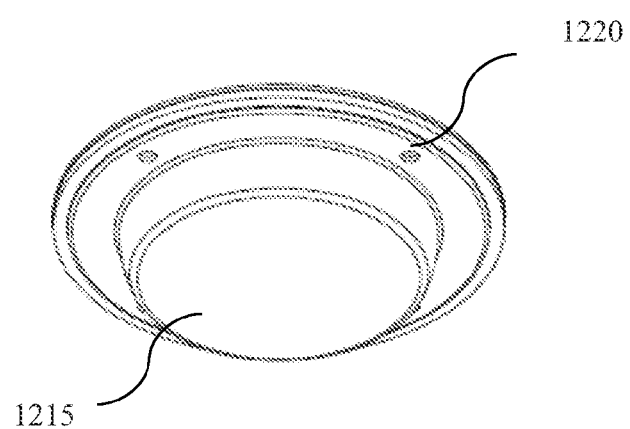

FIG. 12 shows an exemplary assembly 1200 that includes a light engine module 1205 and an optical reflector 1210. The reflector 1210 may direct a substantial portion of the light output from the light engine module 1205 within a prescribed beam angle. Such a reflector may achieve substantially enhanced efficacies in some applications. As depicted in this example, the light engine module 1205 includes a lens module 1215 that is securable to an opposing portion of the housing by mounting holes 1220 arranged around an annular flange portion of the lens module 1215.

The lens module 1215 of this example is a substantially flat section, with a corresponding beam pattern, In various embodiments, the lens may be substantially clear (e.g., transparent plastic, glass). Some other examples may include a diffusive material to promote scattering and more even distribution of light. Various embodiments may incorporate a spectrally shifting filter to adjust the color output, for example. Some examples may incorporate a phosphor and/or nanocrystals to substantially shift at least a portion of the spectral energy from the source, for example, from blue toward green and/or red spectrum light with longer wavelengths.

Figure 13:
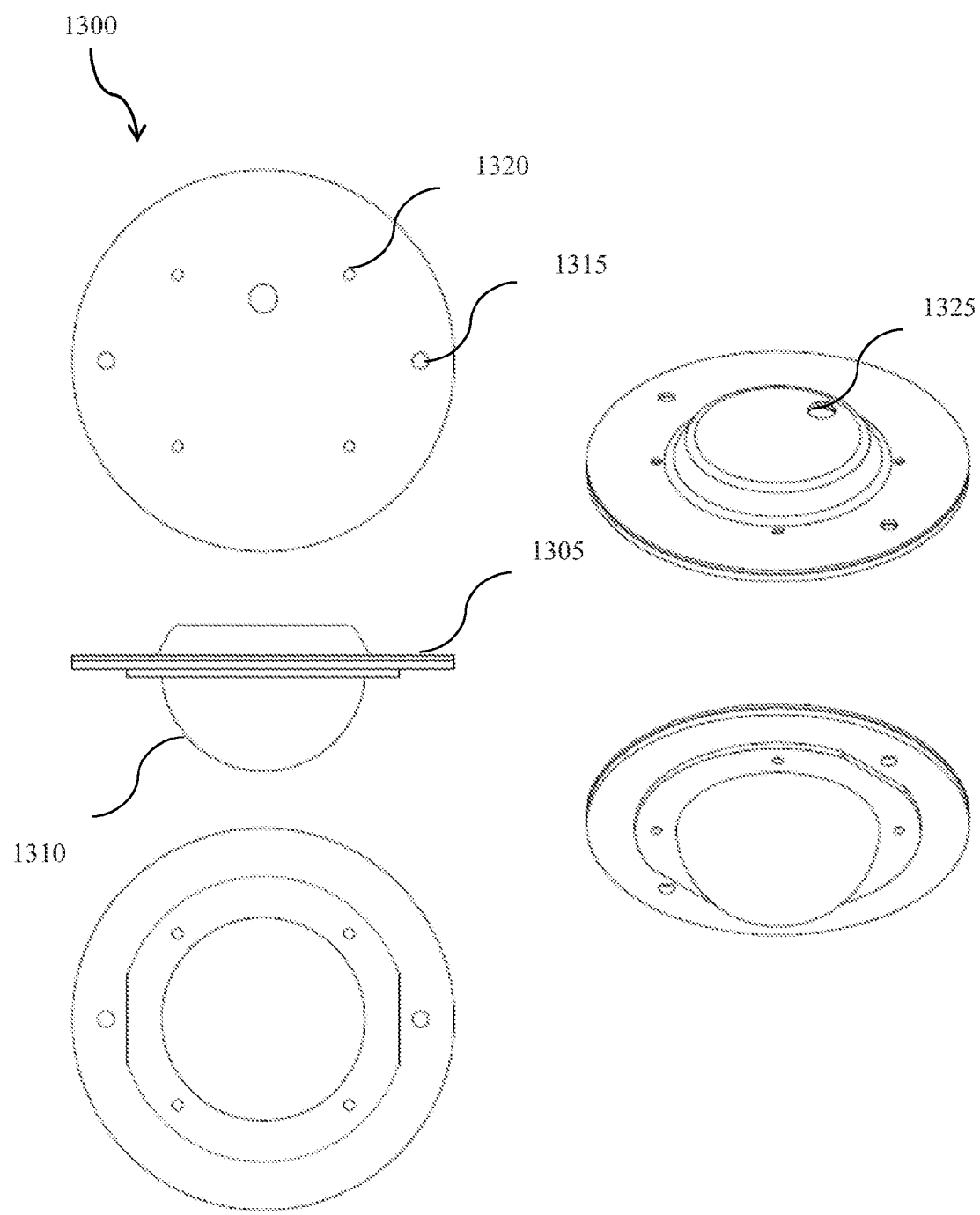

FIG. 13 shows an exemplary light engine assembly 1300 that include a light engine module 1305 and a lens module 1310. The lens module 1310 of this example is a substantially spherical section, with a corresponding beam pattern. In various embodiments, the lens may be substantially clear (e.g., transparent plastic, glass). Some examples may include a diffusive material to promote scattering and more even distribution of light. In the depicted example, the light engine module 1305 housing includes a first array of (e.g., two) concentric holes 1315 for attachment to a conduit body. The light engine module 1305 housing includes a second array of (e.g., three or four) concentric holes 1320 for sealing attachment to the lens module 1310. By way of example and not limitation, the attachments for these holes 1315, 1320 may be, for example, by rivet and/or machine screw, for example.

Figure 14:
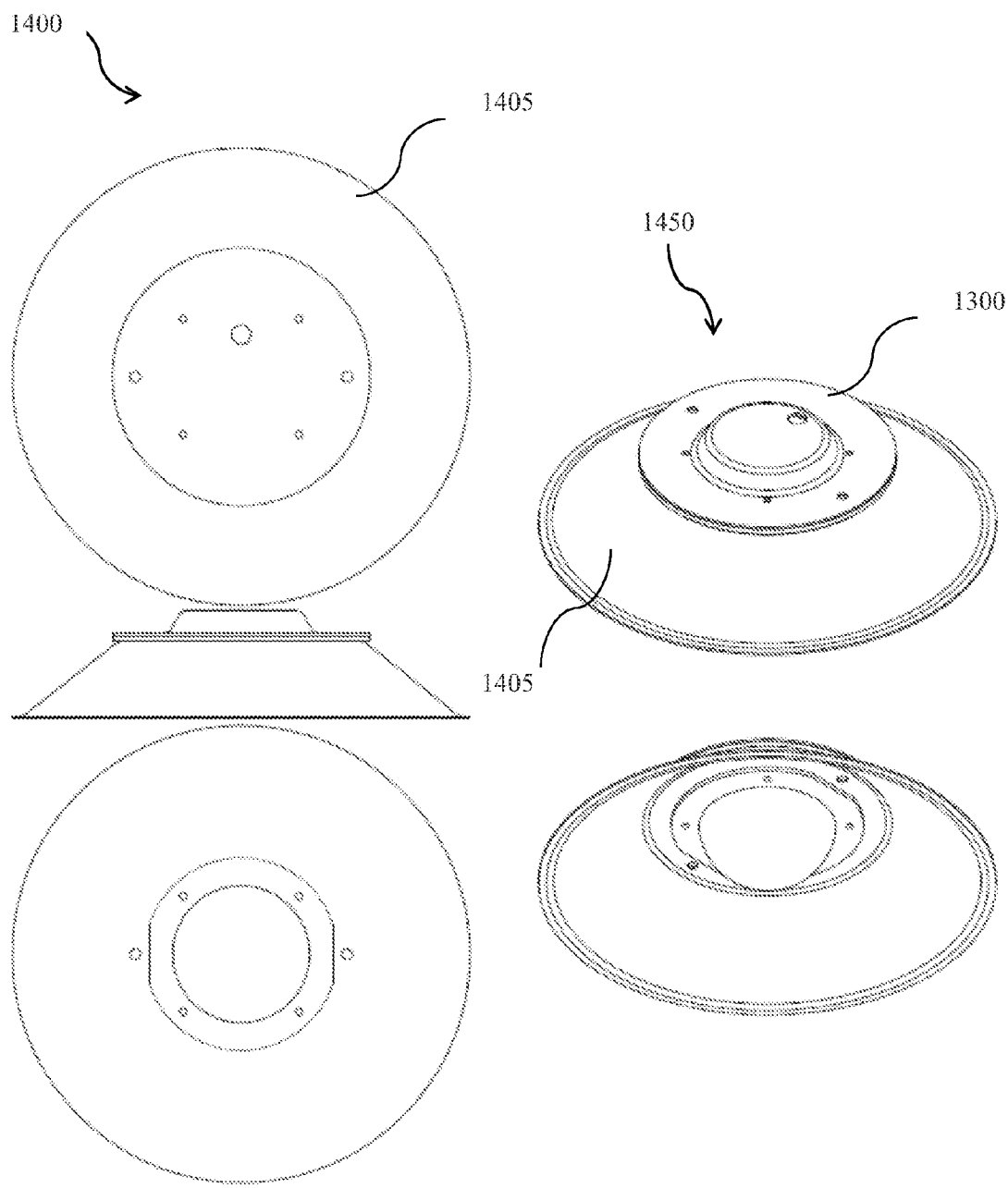

FIG. 14 shows an exemplary assembly 1400 that includes a reflector 1405 with holes provided for attachment to light engine modules, such as the light engine assembly 1300, for example. The holes in the reflector 1405 permit registration with the holes 1315, 1320 of FIG. 13, for example, thereby permitting attachment of the reflector 1405 in various applications. The reflector 1405 may be formed of a thermally conductive material, such as metal (e.g., aluminum-containing substance). The reflector 1405 may advantageously provide a substantially reduced thermal impedance for removing heat from the light engine module. The reflector may be assembled, as an optional feature, with substantially no additional hardware than required to assemble the lens module to the light engine module 1300 as shown in assembly 1450, for example, and/or the light engine assembly 1300 to any appropriate conduit body.

Although various embodiments have been described with reference to the figures, other embodiments are possible. For example, some embodiments may be implemented to illuminate other styles of coops other than free-range style coops. In an illustrative example, some embodiments may position the ILM substantially centered within a cage and directed substantially downward (e.g., with at least a 90 degree beam pattern with respect to one axis) to illuminate the cage while populated with animals. Some implementations may position an ILM above and/or between the food and water facilities in each cage, and directed substantially downward or at a downward angle to illuminate the food and water facilities.

The conduit body 125 of FIG. 1 may be of or compatible with such conduit types as galvanized rigid conduit (GRC), EMT (electrical metallic tubing), FMT (flexible metallic tubing), aluminum, or intermediate metal conduit (IMC) type. Some embodiments may be sized for compatibility with industry standard sizes (e.g., about 0.5, 0.75, 1, 1.25, 1.5, 2, 2.5, 3, 3.5, or 4 inches), or otherwise available in a particular local region. In some examples, the conduit 115 and/or the conduit body 125 may be made of metallic materials, such as aluminum, copper, brass, steel, iron, nickel, or a combination of these or other metals. In some applications, the conductive conduit may be coated, for example by an anodization process or a painting process. In some implementations, metallic materials for the conduit 115 and/or the conduit body 125 may advantageously provide a reduced thermal impedance from the light engine 130 to a local ambient temperature, which may advantageously permit increased light output ratings. Conductive conduit materials may also provide advantages in safety, durability, and may provide a path for current to flow, for example, to a reference potential (e.g., ground).

In some other examples, some or all of the conduit 115 and/or the conduit body 125 may be made of substantially on-conductive materials, such as plastics, such as PVC, for example.

In some embodiments, the signal conditioning performed by the light board 205 of FIG. 2(a) may be performed in response to a control signal. For example, the control signal may be encoded as an amplitude or phase-cut modulated sinusoidal voltage waveform. In some examples, the control signal may include a separate, low voltage or optical signal that is independent of the excitation used to drive the light sources. For example, the control signal may be 0-10V which controls the dimming level of an ILM. In some examples, the control signal may selectively address one or more ILMs arranged in a conduit system. The ILMs selected by an address signal may be controlled in operational states (e.g., on/off, dimming level). In some examples, the ILMs may respond to out-of-band signaling, and/or power line communication techniques. Various implementations may include at least one programmed or programmable processor with access to a set of executable instructions stored in a data store.

In some implementations, conductors in addition to those that supply operating excitation to the ILMs may be routed in some or all sections of the conduit. For example, a redundant set of conductors may be provided in the conduit system to obviate the need to pull new wires if the primary wires fail. Other conductors may supply excitation to loads other than ILM loads.

Some conductors in the conduit may supply different excitation, for example, to provide for multiple zones which may be separately controllable. For an illustrative example, separate excitation may be provided to lighting in the bays 110 of the coop installation 100 and to lighting in the zone near the floor under the bays 110. Accordingly, control may be provided to attract animals to various zones and/or away from other zones by applying differential lighting conditions.

The electrical excitation supplied to the ILMs may be substantially AC, DC, or other suitable waveform for operating the ILMs. Some ILMs may be configured to receive low voltage DC (e.g., 10-24 V), and/or low voltage AC (e.g., safety extra low voltage (SELV)). By way of example and not limitation, some other implementations may be configured to operate from nominal about 50 or 60 Hertz with excitation levels of up to about 100 V, 120 V, 200 V, 208 V, 220 V, 240 V.

This document discloses, with reference to various embodiments, LED lamp assemblies that include a light engine that may be considered substantially sealed against ingress of contaminants, such as liquids (e.g., water spray), dust, or other various contaminants. Certain examples described herein further include integrated thermal management features to provide a low thermal impedance path for transferring heat away from the components within an exemplary sealed light engine, Various embodiments may be formed with a junction box or a conduit body, for example, of standardized sizes to form a light fixture.

Unless indicated otherwise, a light engine may generally be understood as a module that receives an electrical energy as an input and converts the received energy to a light output. In some examples, a light engine may further include components that shape the light output, for example, into a beam.

Some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor, digital signal processor (DSP)), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

In some implementations, a computer program product may contain instructions that, when executed by a processor, cause the processor to adjust the color temperature and/or intensity of lighting, which may include LED lighting. Color temperature may be manipulated by a composite light apparatus that combines one or more LEDs of one or more color temperatures with one or more non-LED light sources, each having a unique color temperature and/or light output characteristic. By way of example and not limitation, multiple color temperature LEDs may be combined with one or more fluorescent, incandescent, halogen, and/or mercury lights sources to provide a desired color temperature characteristic over a range of excitation conditions.

Although some embodiments my advantageously smoothly transition the light fixture output color from a cool color t warm color as the AC excitation supplied to the light engine is reduced, other implementations are possible. For example, reducing AC input excitation may shift color temperature of an LED fixture from a relatively warm color to a relatively cool color, for example.

In some embodiments, materials selection and processing may be controlled to manipulate the LED color temperature and other light output parameters (e.g., intensity, direction) so as to provide LEDs that will produce a desired composite characteristic. Appropriate selection of LEDs to provide a desired color temperature, in combination with appropriate application and threshold determination for the bypass circuit, can advantageously permit tailoring of color temperature variation over a range of input excitation.

In accordance with another embodiment, AC input to the rectifier may be modified by other power processing circuitry. For example, a dimmer module that uses phase-control to delay turn on and/or interrupt current flow at selected pointy in each half cycle may be used. In some cases, harmonic improvement may still advantageously be achieved even when current is distorted by the dimmer module. Improved power factor may also be achieved where the rectified sinusoidal voltage waveform is amplitude modulated by a dimmer module, variable transformer, or rheostat, for example.

In one example, the excitation voltage may have a substantially sinusoidal waveform, such as line voltage at about 120 VAC at 50 or 60 Hz. In some examples, the excitation voltage may be a substantially sinusoidal waveform that has been processed by a dimming circuit, such as a phase-controlled switch that operates to delay turn on or to interrupt turn off at a selected phase in each half cycle. In some examples, the dimmer may modulate the amplitude of the AC sinusoidal voltage AC-to-AC converter), or modulate an amplitude of the rectified sinusoidal waveform (e.g., DC-to-DC converter).

In some implementations, the amplitude of the excitation voltage may be modulated, for example, by controlled switching of transformer taps. In general, some combinations of taps may be associated with a number of different turns ratios. For example, solid state or mechanical relays may be used to select from among a number of available taps on the primary and/or secondary of a transformer so as to provide a turns ratio nearest to a desired AC excitation voltage.

In some examples, AC excitation amplitude may be dynamically adjusted by a variable transformer (e.g., variac) that can provide a smooth continuous adjustment of AC excitation voltage over an operating range. In some embodiments, AC excitation may be generated by a variable speed/voltage electro-mechanical generator (e.g., diesel powered). A generator may be operated with controlled speed and/or current parameters to supply a desired AC excitation to an LED-based light engine, such as the tight engine of FIG. 1, for example. In some implementations, AC excitation to the light engine may be provided using well-known solid state and/or electro-mechanical methods that may combine AC-DC rectification, DC-DC conversion (e.g., buck-boost, boost, buck, flyback), DC-AC inversion (e.g., half- or full-bridge, transformer coupled), and/o direct AC-AC conversion. Solid state switching techniques may use, for example, resonant (e.g., quasi-resonant, resonant), zero-cross (e.g., zero-current, zero-voltage) switching techniques, atone or in combination with appropriate modulation strategies e.g., pulse density, pulse width, pulse-skipping, demand, or the like).

In an illustrative embodiment, a rectifier may receive an AC (e.g., sinusoidal) voltage and deliver substantially unidirectional current to LED modules arranged in series. An effective turn-on voltage of the LED load may be reduced by diverting current around at least one of the diodes in the string while the AC input voltage is below a predetermined level. In various examples, selective current diversion within the LED string may extend the input current conduction angle and thereby substantially reduce harmonic distortion for AC LED lighting systems.

In various embodiments, apparatus and methods may advantageously improve a power factor without introducing substantial resistive dissipation in series with the LED string. For example, by controlled modulation of one or more current paths through selected LEDs at predetermined threshold values of AC excitation, an LED load may provide increased effective turn on forward voltage levels for increased levels of AC excitation. For a given conduction angle, an effective current limiting resistance value to maintain a desired peak input excitation current may be accordingly reduced.

Various embodiments may provide reduced perceptible flicker to humans or animals by operating the LEDs to carry unidirectional current at twice the AC input excitation frequency. For example, a full-wave rectifier may supply 100 or 120 Hz load current (rectified sine wave), respectively, in response to 50 or 60 Hz sinusoidal input voltage excitation. The increased load frequency produces a corresponding increase in the frequency of the illumination, which tends to push the flicker energy toward or beyond the level at which it can be perceived by humans or some animals. This may advantageously reduce stress related to flickering light.

In various embodiments, the intensity may controllable, for example, in response to a light dimmer arranged to modulate AC excitation applied to the LED. As the light intensity is decreased in response to a phase and/or amplitude control, the spectral output may, in some embodiments, shift its output wavelengths. In one example, the LED tight may smoothly shift color output from substantially white at high intensity to substantially blue or green, for example, at a lower intensity. Accordingly, various exemplary installations may provide controlled combinations of intensity and color.

Some embodiments may provide a desired intensity and one or more corresponding color shift characteristics. Some embodiments may substantially reduce cost, size, component count, weight, reliability, and efficiency of a dimmable LED light source. In some embodiments, selective current diversion circuitry may operate with reduced harmonic distortion and/or improved power factor on the AC input current waveform using, for example, simple, tow cost, and/or low power circuitry. Accordingly, some embodiments may reduce energy requirements for illumination, provide desired illumination intensity and color using a simple dimmer control, and avoid illumination with undesired wavelengths.

In some embodiments, the additional circuitry to achieve substantially reduced harmonic distortion may include a single transistor, or may further include a second transistor and a current sense element. In some examples, a current sensor may include a resistive element through which a portion of an LED current flows. In some embodiments, significant size and manufacturing cost reductions may be achieved by integrating the harmonic improvement circuitry on a die with one or more LEDs controlled by harmonic improvement circuitry. In certain examples, harmonic improvement circuitry may be integrated with corresponding controlled LEDs on a common die without increasing the number of process steps required to manufacture the LEDs alone. In various embodiments, harmonic distortion of AC input current may be substantially improved for AC-driven LED loads, for example, using either half-wave or full-wave rectification.

For example, in some embodiments a simple dimmer control may modulate a single analog value (e.g., phase angle, or amplitude) to provide a substantially desired intensity-wavelength illumination. For example, wavelengths for some embodiments may be selected, for example, to substantially emit optimal office illumination at higher AC excitation levels, and shift to blue or red security lighting at energy-saving low AC excitation levels. In some implementations, some security cameras my have a relatively highly sensitivity, for example, to a wavelength emitted at the low AC excitation levels, thereby maintaining adequate lighting for security and electronic surveillance while permitting substantially reduced energy consumption during inactive hours, for example.

This document discloses technology relating to integral conduit modular lighting systems. Related examples may be found in previously-filed disclosures that have common inventorship with this disclosure.

In some examples, light sources may include substantially different illuminants in terms of wavelength output, intensity, and/or optical characteristics. Examples of groups of different light sources that may be suitable are described, for example, with reference to at least FIGS. 7-9 of U.S. Provisional Patent Application entitled "Light Sources Adapted to Spectral Sensitivity of Diurnal Avians," Ser. No. 61/314,617, which was filed by Z. Grajcar on Mar. 17, 2010, the entire contents of which are incorporated herein by reference.

Various examples of apparatus and methods may relate to lighting for providing light energy at wavelengths that substantially correlate to peaks in the spectral sensitivity of animals, such as poultry. Examples of such apparatus and methods are described with reference, for example, at least to FIGS. 2A-2B of U.S. Provisional Patent Application entitled "Light Sources Adapted to Spectral Sensitivity of Diurnal Avians," Ser. No. 61/314,617, which was filed by Z. Grajcar on Mar. 17, 2010, the entire contents of which are incorporated herein by reference.

Some examples may involve dimmable lighting that is viewable by livestock and humans. Examples of conditioning circuits for an LED light engine with selective current diversion to bypass a group of LEDs while AC input excitation is below a predetermined level, with spectral output to substantially match about three spectral sensitivity peaks of a diurnal avian and appear substantially white to human vision, are described with reference, for example, at least to FIGS. 1(a,b) of U.S. Provisional Patent Application Ser. No. 61/314,761, entitled "Dimmable LED Light Engine Adapted to Spectral Sensitivity of Diurnal Avians and Humans," which was filed by Z. Grajcar on Mar. 17, 2010, the entire contents of which are incorporated herein by reference.

Various embodiments relate to dimmable lighting for livestock. Examples of such apparatus and methods are described with reference, for example, at least to FIGS. 3, 5A-6C of U.S. Provisional Patent Application entitled "LED Lighting for Livestock Development," Ser. No. 61/255,855, which was filed by Z. Grajcar on Oct. 29, 2009, the entire contents of which are incorporated herein by reference.

Examples of technology for dimming and color-shifting a light source with AC excitation are described with reference, for example, to the various figures of U.S. Provisional Patent Application entitled "Color Temperature Shift Control for Dimmable AC LED Lighting," Ser. No. 61/234,094, which was filed by Z. Grajcar on Aug. 14, 2009, the entire contents of which are incorporated herein by reference.

Examples of technology for improved power factor and reduced harmonic distortion for color-shifting a light source are described with reference, for example, at least to FIGS. 20A-20C of U.S. Provisional Patent Application entitled "Reduction of Harmonic Distortion for LED Loads," Ser. No. 61/233,829, which was filed by Z, Grajcar on Aug. 14, 2009, the entire contents of which are incorporated herein by reference.

Further embodiments of tight engines for a lighting system are described with reference, for example, at least to FIGS. 1, 2, 5a-5B, 7A-7B, and 10A-10B of U.S. Provisional Patent Application entitled "Architecture for High Power Factor and Low Harmonic Distortion LED Lighting," Ser. No. 61/255,491, which was filed by Z. Grajcar on Oct. 28, 2009, the entire contents of which are incorporated herein by reference.

Various embodiments may incorporate one or more electrical interfaces for making electrical connection from the lighting apparatus to an excitation source. An example of an electrical interface that may be used in some embodiments of a downlight is disclosed in further detail with reference, for example, at least to FIG. 1-3, or 5 of U.S. Design Patent Application entitled "Lamp Assembly," Ser. No. 29/342,578, which was filed by Z. Grajcar on Oct. 27, 2009, the entire contents of which are incorporated herein by reference.

Some embodiments of a light apparatus may be integrated with packaging and/or thermal management hardware. Examples of thermal or other elements that may be advantageously integrated with the embodiments described herein are described with reference, for example, to FIG. 15 in U.S. Publ. Application 2009/0185373 A1, filed by Z. Grajcar on Nov. 19, 2008, the entire contents of which are incorporated herein by reference.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A device for illumination, comprising:
   a conduit body;
   a light board including electrical circuitry disposed on a substrate with a first side and a second side defining opposing planar surfaces;
   a light engine module comprising an array of light sources arranged on the first side of the substrate that supplies electrical excitation to the array of light sources;
   a lens module having an interior lens surface engaging the substrate of the light board to form an enclosed light chamber between the first side of the substrate and the interior lens surface and containing the array of light sources: and,
   at least one mounting hole for securely mounting the light engine module in a fixed position relative to the conduit body.

2. The device of claim 1, wherein the conduit body comprises an industry standard electrical junction box.

3. The device of claim 1, wherein the conduit body has an industry standard form factor.

4. The device of claim 1, wherein the electrical excitation signals comprise an alternating current (AC) signal.

5. The device of claim 4, wherein the electrical excitation signals are nominally above 100 Volts peak.

6. The device of claim 1, further comprising a reflector to direct the light output substantially within a beam angle according to a shape of the reflector.

7. The device of claim 6, wherein the reflector comprises a thermally conductive material to transfer heat away from the light engine module.

8. The device of claim 1, wherein an electrical interface disposed on the second side of the substrate and adapted to receive electrical excitation signals to operate the light engine.

9. The device of claim 1, wherein the lens module is sealably engaged with the substrate of the light board to resist the ingress of moisture, contaminants, or foreign objects.

10. The device of claim 1 wherein the substrate is a printed circuit board.

11. A method of installing a device for illumination, comprising:
    providing an electrical conduit connected to corresponding ports of an integral light module having a conduit body;
    providing a substrate with a first side and a second side defining opposing planar surfaces;
    providing a light engine module comprising an array of light sources arranged on the first side of the substrate;
    forming an enclosed light chamber between the first side of the substrate and an interior surface of a lens; and,
    securely mounting the substrate and lens to the conduit body of the integral light module.

12. The method of claim 11, further comprising coupling AC electrical excitation signals to the light engine module through an electrical interface accessible from the second side of the substrate.

13. The method of claim 12, wherein coupling AC electrical excitation further comprises making electrical connection to a supply conductor using an insulation displacement connection.

14. The method of claim 11, further comprising processing electrical excitation signals received by the light engine module and supplying the processed electrical excitation signals to the array of light sources.

15. The method of claim 14, wherein the electrical excitation signals comprise an alternating current (AC) signal.

16. The method of claim 14, wherein the electrical excitation signals are nominally above 100 Volts peak.

17. The method of claim 11, further comprising providing an optical reflector in thermal communication with the array of light sources.

18. The method of claim 17, further comprising directing light output from the light sources substantially within a beam angle according to a shape of the reflector.

19. The method of claim 17, further comprising transferring substantial heat away from the light engine module through the thermally conductive optical reflector.

\* \* \* \* \*

UNITED STATES PATENT AND TRADEMARK OFFICE
CERTIFICATE OF CORRECTION

PATENT NO. : 8,651,691 B2  Page 1 of 1
APPLICATION NO. : 13/077955
DATED : February 18, 2014
INVENTOR(S) : Zdenko Grajcar It is certified that error appears in the above-identified patent and that said Letters Patent is hereby corrected as shown below:

On the Title Page - Item (73) Assignee

"ONCE Innovations, Inc., Plymouth, NJ" should read --ONCE Innovations, Inc., Plymouth, MN--.

Signed and Sealed this
Twelfth Day of August, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,651,691 B2  
APPLICATION NO. : 13/077955  
DATED : February 18, 2014  
INVENTOR(S) : Zdenko Grajcar It is certified that error appears in the above-identified patent and that said Letters Patent is hereby corrected as shown below:

In the Specification

Page 16, Column 1, Line 47, change "tight" to --light--  
Page 16, Column 2, Line 38, add --in-- before various  
Page 16, Column 2, Line 53, add --two-- before rows  
Page 17, Column 4, Line 49, change "wire-to-hoard" to --wire-to-board--  
Page 17, Column 4, Line 54, change "board-mourned" to --board-mounted--  
Page 18, Column 5, Line 32, add --of-- before different  
Page 18, Column 5, Line 52, change "proved" to --improved--  
Page 18, Column 5, Line 65, add --)-- after spray  
Page 19, Column 7, Line 25, add --(-- before e.g.,  
Page 19, Column 7, Line 47, change "tight" to --light--  
Page 20, Column 9, Line 8, change "on-conductive" to --non-conductive--  
Page 20, Column 10, Line 36, change "t" to --to a--  
Page 20, Column 10, Line 53, change "pointy" to --points--  
Page 21, Column 11, Line 1, add --(e.g.,-- before AC-to-AC  
Page 21, Column 11, Line 20, change "tight" to --light--  
Page 21, Column 11, Line 26, change "and/o" to --and/or--  
Page 21, Column 11, Line 29, change "atone" to --alone--  
Page 21, Column 11, Line 30, change "e.g.," to --(e.g.,--  
Page 21, Column 12, Line 1, change "tight" to --light--  
Page 21, Column 12, Line 13, change "tow" to --low--  
Page 21, Column 12, Line 42, change "my" to --may--  
Page 22, Column 13, Line 39, change "tight" to --light--

Signed and Sealed this  
Thirtieth Day of September, 2014

Michelle K. Lee  
*Deputy Director of the United States Patent and Trademark Office*